(12) United States Patent
Coulter et al.

(10) Patent No.: US 8,731,588 B2
(45) Date of Patent: May 20, 2014

(54) ALERT FEATURE FOR TEXT MESSAGES

(75) Inventors: Peter Coulter, Flanders, NJ (US); Adam Panagia, Wanaque, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1025 days.

(21) Appl. No.: 12/288,092

(22) Filed: Oct. 16, 2008

(65) Prior Publication Data

US 2010/0099444 A1  Apr. 22, 2010

(51) Int. Cl.
*H04W 4/00* (2009.01)

(52) U.S. Cl.
USPC .......................... 455/466; 709/224; 709/225

(58) Field of Classification Search
USPC .................................. 455/466; 709/224, 225
See application file for complete search history.

(56) References Cited

U.S. PATENT DOCUMENTS

| | | | |
|---|---|---|---|
| 5,884,033 A | 3/1999 | Duvall et al. | |
| 5,987,606 A | 11/1999 | Cirasole et al. | |
| 6,182,118 B1 | 1/2001 | Finney et al. | |
| 6,782,085 B1 | 8/2004 | Becker et al. | |
| 7,072,942 B1 * | 7/2006 | Maller | 709/206 |
| 7,076,527 B2 | 7/2006 | Bellegarda et al. | |
| 7,433,924 B2 * | 10/2008 | Malcolm | 709/206 |
| 7,522,060 B1 * | 4/2009 | Tumperi et al. | 340/573.4 |
| 2005/0182630 A1 * | 8/2005 | Miro et al. | 704/269 |
| 2005/0186976 A1 | 8/2005 | Benco et al. | |
| 2006/0036701 A1 * | 2/2006 | Bulfer et al. | 709/206 |
| 2007/0208569 A1 * | 9/2007 | Subramanian et al. | 704/270 |
| 2007/0233861 A1 * | 10/2007 | Cai et al. | 709/225 |
| 2008/0004049 A1 * | 1/2008 | Yigang et al. | 455/466 |
| 2008/0114838 A1 * | 5/2008 | Taylor | 709/206 |
| 2008/0147408 A1 * | 6/2008 | Da Palma et al. | 704/270.1 |
| 2009/0089417 A1 * | 4/2009 | Giffin et al. | 709/224 |
| 2009/0175422 A1 * | 7/2009 | Marics et al. | 379/45 |
| 2010/0036918 A1 * | 2/2010 | Gupta | 709/206 |

* cited by examiner

*Primary Examiner* — Jinsong Hu
*Assistant Examiner* — Qun Shen
(74) *Attorney, Agent, or Firm* — Wolff & Samson, PC (57) ABSTRACT

The technology disclosed in this specification includes a method and system for analyzing text messages, and more particularly a method and system for providing an alert feature for text messages based at least in part on an analysis of the signaling data associated with the text messages. Subscribers of a family plan wireless account (e.g., parents or guardians) or a designated third party may receive a report if an account member's text message contains objectionable material, such as content relating to explicit sexual matters, drugs, alcohol, gangs or violence.

12 Claims, 6 Drawing Sheets

ALERT FEATURE FOR TEXT MESSAGES

BACKGROUND

The dangers of electronic communications, such as email, text messages and the internet, and the need to protect children from bad influences, such as cyber stalkers and online predators, have been well publicized and continue to be a problem. Many families wish to prevent their children from accessing messages that contain sexually explicit, drug, alcohol, gang, violence or other objectionable content. Many parents or guardians are concerned about online safety. Software packages for managing access to, and monitoring and filtering the content of, web sites, emails, and instant message conversations have helped somewhat, but these measures have not been fully effective.

Because of their inherent mobility and anonymity, cellular phones, Personal Digital Assistants (PDA's), Blackberries and other such devices that provide text messaging service are perceived by law enforcement authorities as especially problematic for parents when trying to protect their children from cyber stalkers and other undesirable influences. The alert feature for text messages disclosed in this specification addresses these and other problems.

SUMMARY

One embodiment of the text message alert feature disclosed in this specification involves a method for monitoring text messages. The signaling data that is associated with a text message is analyzed to determine if the text message is likely to contain objectionable or inappropriate content. Also, the text message may be compared against a glossary of key words and text phrases to determine if the text message likely contains objectionable material. If the text message is likely to contain such content or other inappropriate content, a report may be sent to a third party such as the parent or guardian of the intended recipient or a local authority. It should be understood that the report does not necessarily need to be sent to a subscriber of the account.

In an alternative aspect of the technology disclosed in this specification, text messages and associated signaling data are stored and later analyzed for objectionable content, such as content relating to explicit sexual matters, drugs, alcohol, gangs and violence. If the text message likely contains such content or other inappropriate content, a report may be sent to a third party, such as the parent or guardian of the intended recipient.

An alternative embodiment of the technology disclosed in this specification may include the retrieval of inbound and outbound text messages and signaling information, which may then be shared with the third party, e.g., parent or guardian of the intended recipient.

In an alternative embodiment, a translator may be used to convert from text message shorthand, a characteristic of text messages, to standard language. In addition to full text downloads, customized keyword filtering and real time alerts may also be provided to the third party, e.g. parent or guardian of the intended recipient, who desires real time monitoring capability.

The message header, signaling information, or the message itself may be provided to the parent or guardian of the intended recipient, or to a designated third party, to provide additional insight into those with whom the intended recipient is communicating. The parent, guardian or designated third party then may either inform the intended recipient that their text messages are being monitored, or they may monitor the text messages, perhaps covertly.

The technology may also include a method and system that sends a response to the sender of objectionable material, requesting the sender to cease and desist from sending further text messages. The method also enables the sending of an objectionable text message and its associated signaling information to local authorities.

These and other advantages of the technology disclosed in this specification will be apparent to those of ordinary skill in the art by reference to the following detailed description and the accompanying drawings.

DETAILED DESCRIPTION

Text messaging is a widely used communications service that enables the transmission of alphanumeric messages between communications devices. According to a report released by the Cellular Telecommunications Industry Association (CTIA), approximately 75 billion text messages were sent within the United States in June, 2008, averaging about 2.5 billion text messages sent per day. (see "U.S. Text Usage Hits Record Despite Price Increases", published by CTIA Fall 2008, Sep. 10, 2008, http://reviews.cnet.com/8301-12261_7-10038634-51.html, retrieved on Sep. 16, 2008).

Figure 1:
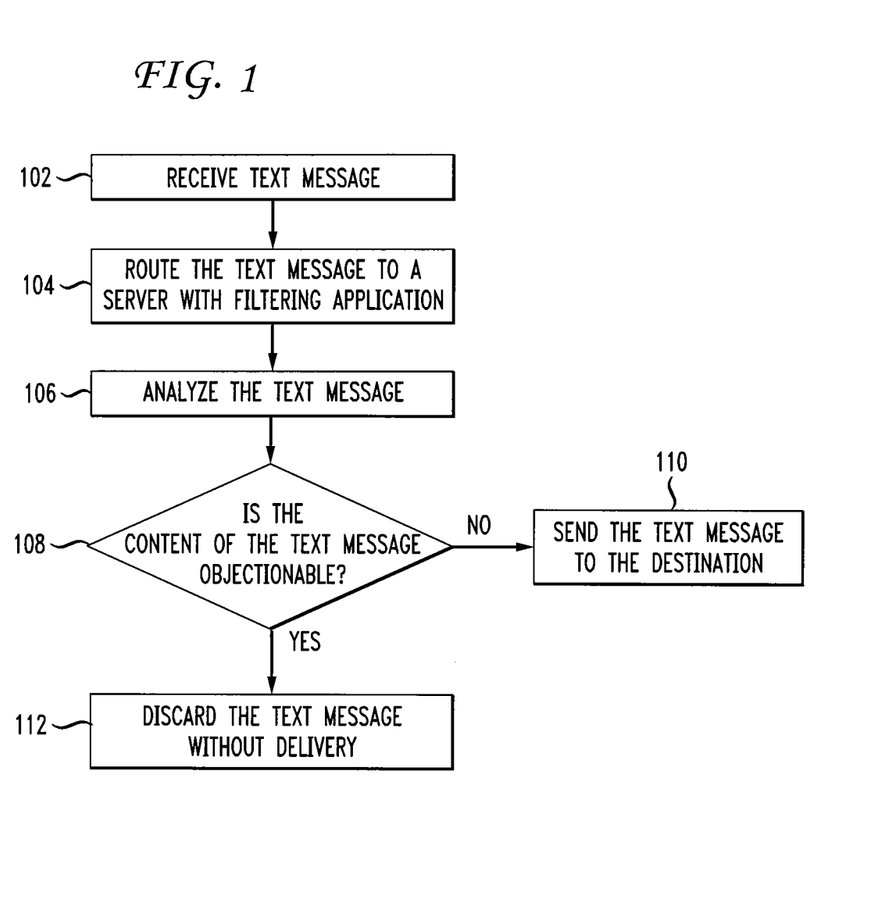
FIG. 1 is a schematic diagram of a text message filtering method.

FIG. 1 depicts a text message filtering system. A device receives a text message at 102. At 104, the message is routed to a server with a filtering application. At 106, the filtering application analyzes the text message to determine, at 108, if the text message contains objectionable or inappropriate content. An example of text message analysis is based on rule sets. The text message filtering system collects data parameters from the text message and applies a rule based algorithm to determine the result of the analysis.

If the text message does not contain objectionable or inappropriate content, then, at 110, the text message is sent to the destination. If the text message contains objectionable or inappropriate content, then, at 112, the text message is discarded without delivery.

It will be understood by a person having ordinary skill in the art that the technology disclosed in this specification is not limited to text messages. Alternative forms of communication such as pictures, images, audio, multimedia, etc. are included within the scope of the technology disclosed in this specification.

Figure 2:
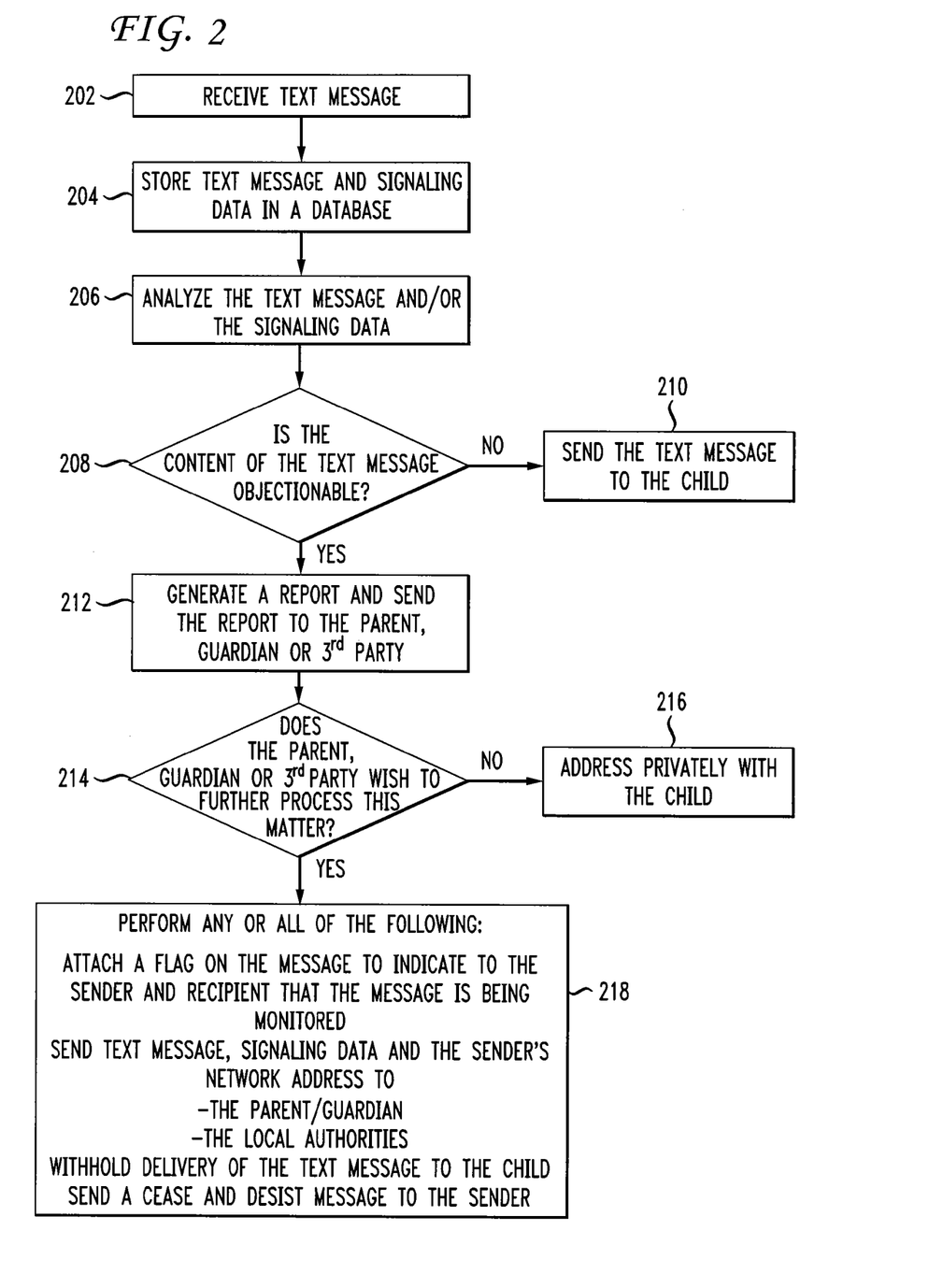
FIG. 2 is a flow chart depicting one implementation of the technology disclosed in this specification.

FIG. 2 illustrates a flow chart depicting an embodiment of the technology disclosed in this specification. The algorithm as described in this flow chart may be executed by code that is running on a computer. The subscriber enrolls communications devices such as cellular phones, computers or PDAs in a family plan account for text message service. A network may receive a text message at 202. The text message and associated signaling data is stored in a database at 204 for future retrieval. The term signaling data refers to the control information used to route and transmit a message from the sender to the intended recipient. Examples of control information includes the digits used by the sender, phone number or IP address for the sender and the intended recipient, the physical location of the transmitter/receiver (e.g., cellular base station) for the sender and intended recipient, the date and time that the message was sent and received, and other transmission-related information.

The database referred to at step 204 may be similar to the Daytona® data management system or an equivalent system. The Daytona® data management system, developed and used by AT&T, involves the storage of data relating to call records and the mining of such data. (See U.S. Pat. No. 6,782,085, Method for Mapping Call Detail Data into a Database for Quick Retrieval, Becker et al.). As of June 2007, the Daytona® data warehouse system was managing over 2.8 trillion records with over 938 billion records in the largest table. (See www.research.att.com/~daytona/, retrieved on Sep. 11, 2008). As depicted in step 206, analysis of the text message and/or signaling data stored in a database, such as Daytona®, could reveal at step 208, not only messages with objectionable content, but also the identity of the sender of such material (e.g., the sender's network address or phone number) and the location of the recipient.

The Daytona® data management system uses a method for mapping and storing call detail data reports for quick retrieval. The contents of the call detail data is governed by an industry standard for describing a phone call, usually for billing purposes. In a typical day, hundreds of millions of calls are completed and a substantially equal number of call detail data records are processed. (Becker, column 3, lines 57-60).

In general, the Daytona® data management system uses two databases. The first database stores a portion of the call detail data. In this database, the more common or generally useful information relating to the call detail data is mapped into an Interpreted Usage Event (IUE) and indexed for quick data retrieval. The second database, which is less structured, stores the raw call detail data records. The data that is stored in the second database may be retrieved in response to additional queries. The retrieving of the IUE from the first database is executed more quickly than retrieving the records from the second database. (Becker, column 2, lines 45-49).

The analysis of the text message and/or signaling data at step 206 may be implemented by, for example, comparing a glossary of key words and text phrases against the phrases within the text message. This type of analysis could be performed in real time (e.g., such an analysis is performed immediately and without interruption). This real time analysis enables the blocking of the objectionable text message from delivery to the intended recipient.

In an alternative aspect of the disclosed technology, a more in-depth analysis of the text message and/or signaling data may be performed in non-real time. A non-real time analysis of the text message may include a comparison of the glossary of key words and text phrases against substantially all of the stored incoming and outgoing messages to and from the intended recipient. The non-real time analysis could also include the examination of the associated signaling data to determine the origin and destination of the text messages. The non-real time analysis could provide further insight to a third party, such as the parent or guardian of the intended recipient, because the analysis is more detailed and may include historical data. A non-real time analysis could provide information such as the tone of the message, the frequency at which objectionable text messages are sent to and from the intended recipient, the dates and times that the objectionable text messages are sent or received, whether the messages are incoming vs. outgoing, the identity of the sender of such material (e.g., the sender's network address or phone number) and the location of the recipient.

As depicted in step 208, a determination may be made as to whether the text message contains objectionable or inappropriate content. Such a determination may be based on the analysis of the text message and/or signaling data as performed in step 206. Analysis of the signaling data could indicate if the text message was sent by a sender who is known for sending text messages with objectionable content. If the content of the text message is determined to be not objectionable, then at step 210 the text message may be sent to the intended recipient's (e.g., child's) communication device. If the text message contains objectionable or inappropriate content, then at step 212 a report may be generated and may be delivered to the account holder (e.g., the intended recipient's parent or guardian), in the manner they have chosen.

The report referenced in step 212 may be in the form of a message, an alarm or an alert. A report is a message to the subscriber indicating the presence or absence of objectionable text messages that have been sent to an authorized user on their account. An example of such a report may be as follows:

To: Subscriber of Family Plan Account #12345
From: The XYZ Service Provider Security Department
A user in your Family Plan account has received a text message that may be objectionable or inappropriate.

The report may be delivered to the subscriber (e.g., parent or guardian of the intended recipient of the inappropriate text message), or a designated third party, either via a cellular phone or landline phone call, a text message, an email, a page, a facsimile, a letter, etc., in accordance with the subscriber's preference. For example, the subscriber may elect to have the report delivered in real time, where the report is delivered to the subscriber substantially immediately after the text message is delivered to the intended recipient. This time period may range from less than a few seconds to a few minutes after such delivery. However, such real time reports could be problematic because a large volume of inappropriate text messages would generate an equally large volume of reports to the subscriber. Consequently, the subscriber may elect to limit the delivery of the report to a time period, such as one report per hour or one report per day.

At step 214, the subscriber (e.g., parent or guardian of the intended recipient) or designated third party may decide whether further action should be taken. If the parent or guardian of the intended recipient decides that the no further action should be taken, then at step 216 the parent or guardian may address the report privately with the child.

However, if the parent, guardian or designated third party at step 214 wishes to take further action with regard to the objectionable text message, then one or more functions may be performed as indicated in step 218.

In one aspect of the disclosed technology as shown in step 218, a flag (e.g. an icon or an indicator) may be attached to the text message, including placing the flag in or on the text message or otherwise associating the flag with the text message, to remind the sender and recipient that this communication is being monitored.

In another aspect of the disclosed technology as shown in step 218, the text message may be translated from text message shorthand into a standard language, such as English, Spanish, French, etc. For example, according to the website: www.mahalo.com/How_to_Understand_Your_Kids'_Text_Messages the character string "LOL" is translated to "Laughing Out Loud"; "BFF" means "Best Friends Forever", "RUOK" stands for "Are you OK?" and "CU 2MORW" means "See you tomorrow". While these examples may not be considered objectionable, the following acronyms may give parents reason for concern. For example, the text message shorthand translation for "WYRN" is, "What's your real name?" and "LMIRL" stands for "Let's meet in real life". There are several other acronyms and text phrases that are commonly used for sexually explicit, alcohol, drug, gang, violence, etc. related messages. A network-based translator may be used by parents or guardians who might not be familiar with text message shorthand.

Another alternative of this technology, as shown in step 218, may include enabling the parent, guardian or designated third party to retrieve the objectionable text message, the translation of the objectionable text message, signaling data and/or the sender's network address or phone number. At step 218, any or all of 1) the objectionable text message, 2) the translation of the objectionable text message, 3) signaling data, 4) the sender's network address, or 5) the sender's phone number, may be provided to local authorities.

In another aspect of the disclosed technology, at step 218 the report may include the inappropriate text message, the translation of the text message, the identity of the sender, or the transmitting location of the originating text message. An example of such a report may be as follows:
To: Subscriber of Family Plan Account #12345
From: The XYZ Service Provider Security Department
A user in your Family Plan account has received the following text message that may be objectionable or inappropriate:
WYRN LMIRL UR BFF JOE
Translation: What's your real name? Let's meet in real life. Your Best Friend Forever,
Joe
Sender: Joe Schmoe, phone #123-456-7890,
IP address: 12.34.56.789
IP address location: New York, N.Y.
Transmitted from: New York City at the intersection of Broadway and 42$^{nd}$ street.
Received at: Livingston, N.J., intersection of Route 10 and Eisenhower Parkway.
Incoming Message received on: Oct. 3, 2008 at 20:36 EST.

Also at step 218, the delivery of the objectionable text message to the intended recipient may be withheld. Step 218 may also include delivering a message in response to the sender of the objectionable text message, requesting the sender to cease and desist from sending any further messages to the child. An example of such an report may be as follows:
To: Joe Schmoe, phone #123-456-7890,
IP address: 12.34.56.789
IP address location: New York, N.Y.
From: The XYZ Service Provider Security Department
The text message that you sent is deemed objectionable or inappropriate:
WYRN LMIRL UR BFF JOE
Please cease and desist from sending any further text messages to this intended recipient.
Should you persist in sending such text messages to this intended recipient, this matter will be referred to local or Federal authorities.

Figure 3:
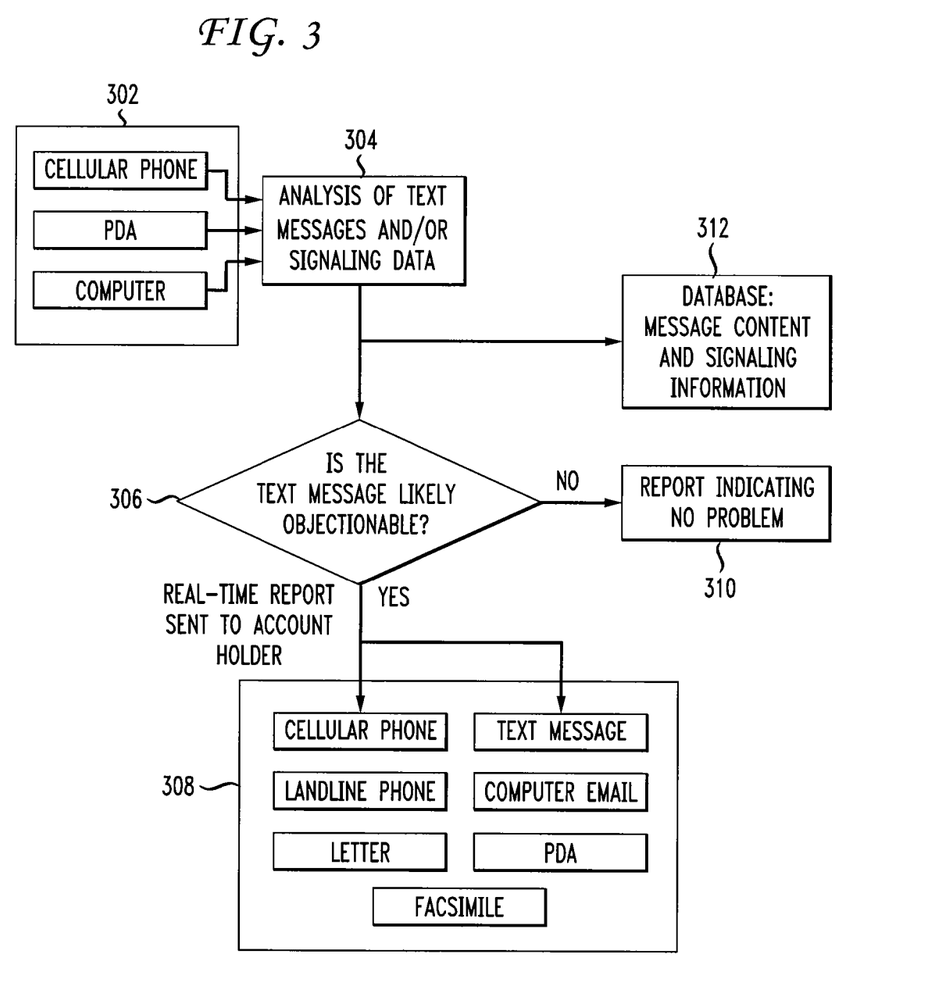
FIG. 3 is a diagram of an embodiment of the technology disclosed in this specification which may include data capture, inspection and alarming.

FIG. 3 is a diagram of the previously mentioned embodiment of the disclosed technology which may include real-time data capture, inspection and alarming. The text message sent by a sender at device 302 may be subject to inspection at step 304, where the signaling data is analyzed and/or the content of the text message is compared against a glossary of key words and text phrases. If, at step 306, the text message likely contains objectionable or inappropriate content, then a report may be sent to the account holder (e.g., recipient's parent or guardian) via cellular phone, text message, landline phone, email, letter, facsimile, etc. at step 308. If, at step 306, the text message likely does not contain objectionable material, then at step 310 a report may be sent to the recipient's parent or guardian indicating that there are no known issues regarding the content of the text messages sent to the children. At step 312, the text message and signaling information may be stored in a database for future retrieval and analysis. Such a database may be similar to the AT&T Daytona® data management system as previously described.

Figure 4:
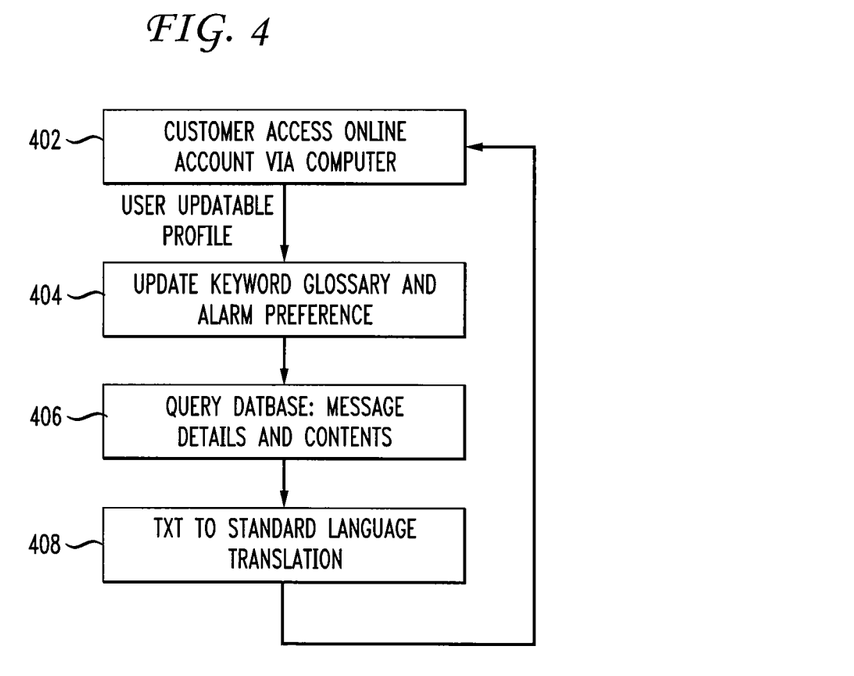
FIG. 4 is a diagram of an embodiment of the technology disclosed in this specification which may include data presentation and user preference maintenance.

FIG. 4 is a diagram of an alternative embodiment of this technology, which may include data presentation and user preference maintenance. Step 402 depicts a computer or equivalent device which may be used by the account holder (e.g., parent or guardian). The account holder may update his or her profile to choose the form of a report. At step 404, the account holder may also use such a computer to update the keyword glossary, report preference (e.g., email, fax, etc.), frequency of reports, etc. At step 406, the account holder queries the database and retrieves text messages and signaling information from the database. At step 408, the text message may be translated from text message shorthand to a standard language.

Figure 5:
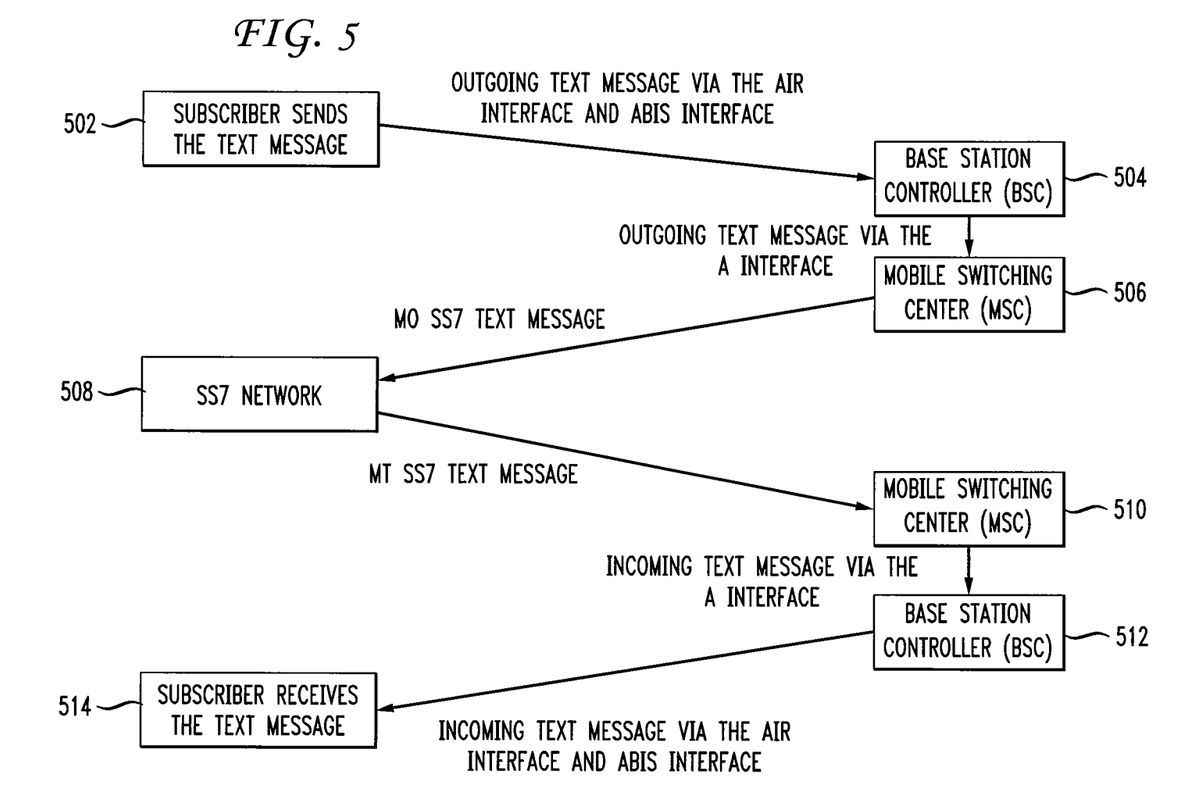
FIG. 5 is a diagram of an embodiment of the technology disclosed in this specification which may include the routing of text messages.

FIG. 5 is a diagram of an embodiment of the disclosed technology showing one example of the routing of the text message. Transmission of text messages may use the Common Channel Signaling System #7 (CCSS7 or SS7) protocol. SS7 is a widely used signaling protocol that is defined and recognized as an international standard by the International Telecommunication Union. The main purpose of SS7 is to set up, maintain and release phone communications over the Public Switched Telephone Network. SS7 signaling information includes the signaling data for the text message, which, as explained above, is the control information used to route and transmit a message from the sender to the intended recipient. SS7 signaling information may also include the text message.

At step 502, a text message is sent from a subscriber, such as a user of cellular phone service, to an intended recipient. At step 504, the text message is transmitted from a cellular phone to a cellular base station controller via the Air and Abis interface. The Air and Abis interface are defined in the GSM specifications as the interfaces between a cellular phone and the Base Station Controller (BSC). At step 506, the text message is transmitted from the base station to the Mobile Switching Center (MSC) via the A interface. The A interface is defined in the GSM specification as the interface between the MSC and the BSC. At step 508, the mobile originating (MO) SS7 text message is transmitted from the MSC to the SS7 network. At step 510, the SS7 network routes the mobile terminating (MT) SS7 text message to the MSC of the intended recipient. At step 512, the text message is transmitted from the MSC to the BSC via the A interface. The intended recipient receives the text message at step 514 from the BSC via the Air and Abis interface.

Figure 6:
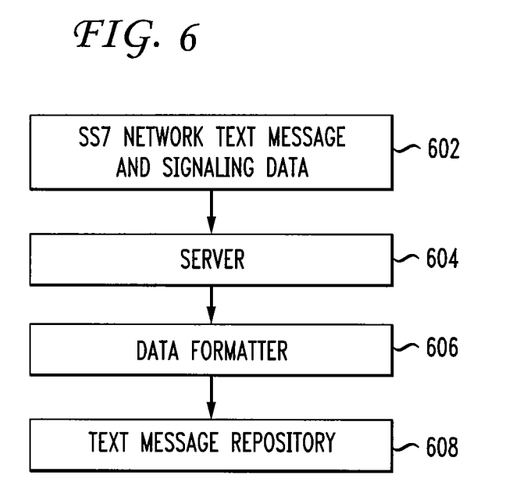
FIG. 6 is a diagram of an embodiment of the technology disclosed in this specification which may include the storage of text messages and its associated signaling data.

FIG. 6 is a diagram of an embodiment of the disclosed technology which may include the storage of the text message and signaling data. At step 602, the text message and associated signaling data are transmitted to a server at step 604. A server refers to a computer attached to the SS7 network with the primary purpose of providing a location for the shared storage of the text message and associated signaling data. At step 606, the text message and associated signaling data is transmitted to a device that converts the data to an appropriate format for storage and quick retrieval. At step 608, the text message and associated signaling data is stored in a repository. Such a repository may be similar to the AT&T Daytona® data management system as previously described. The repository at step 608 may store the text message in text message shorthand, or it may store the translated version(s) of the text message, or it may store all versions of the text message.

Figure 7:
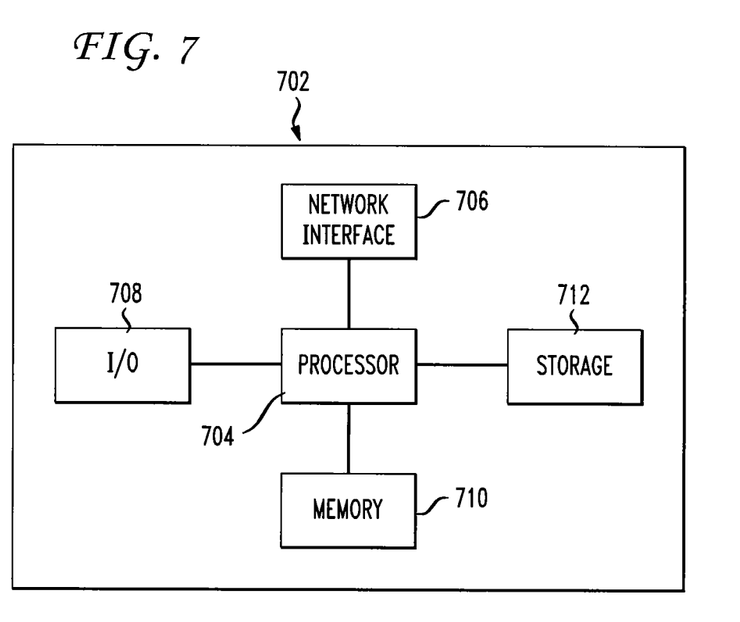
FIG. 7 is high level block diagram of a computer capable of implementing the technology disclosed in this specification.

The above-described methods may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712, or other computer readable medium (e.g., magnetic disk, CD ROM, etc.), and loaded into memory 710 when execution of the computer program instructions is desired. Thus, the method steps of FIGS. 2, 3 and 4 can be defined by the computer program instructions stored in the memory 710 and/or storage 712 and controlled by the processor 704 executing the computer program instructions. For example, the computer program instructions can be implemented as computer executable code programmed by one skilled in the art to perform an algorithm defined by the method steps of FIGS. 2, 3 and 4. Accordingly, by executing the computer program instructions, the processor 704 executes an algorithm defined by the method steps of FIGS. 2, 3 and 4. The computer 702 also includes one or more network interfaces 706 for communicating with other devices via a network. The computer 702 also includes other input/output devices 908 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for monitoring a text message having associated signaling data, the method comprising:

analyzing the signaling data at a server;

analyzing the text message in real time enabling blocking of an objectionable text message from delivery to an intended recipient;

determining an identity of a sender of the text message;

generating, based on the analyzing the signaling data and the analyzing the text message, a report indicating a presence of objectionable content in the text message and the identity of the sender, wherein the text message contains text message shorthand and the report includes the text message and a standard language usage translation of the text message shorthand included in the text message, the report delivered in real time to a local authority via a telephone call and to a parent of the intended recipient via a telephone call;

withholding, based on the analyzing the text message, delivery of the text message;

withholding, based on the analyzing the signaling data, delivery of text messages from the sender; and sending a message to the sender of the text message, the message including a flag indicating that the text message is being monitored and requesting the sender to cease and desist from sending further text messages.

2. The method of claim 1 further comprising:

retrieving the text message and associated signaling data from a database.

3. The method of claim 2 wherein the text message is a translation from text message shorthand to standard language usage.

4. The method of claim 2 wherein the report is additionally delivered to one of a guardian of the intended recipient and a designated third party.

5. The method of claim 1 further comprising, after the analyzing the signaling data, attaching an indicator to the text message.

6. The method of claim 2 wherein a group of text messages and a group of signaling data that are sent by a group of subscribers are stored in the database.

7. A non-transitory computer readable storage medium storing computer program instructions for monitoring a text message having associated signaling data, which, when executed on a processor, cause the processor to perform operations comprising:

analyzing the signaling data;

analyzing the text message in real time enabling blocking of an objectionable text message from delivery to an intended recipient;

determining an identity of a sender of the text message;

generating, based on the analyzing the signaling data and the analyzing the text message, a report indicating a presence of objectionable content in the text message and the identity of the sender, wherein the text message contains text message shorthand and the report includes the text message and a standard language usage translation of the text message shorthand included in the text message, the report delivered in real time to a local authority via a telephone call and to a parent of the intended recipient via a telephone call;

withholding, based on the analyzing the text message, delivery of the text message;

withholding, based on the analyzing the signaling data, delivery of text messages from the sender; and sending a message to the sender of the text message, the message including a flag indicating that the text message is being monitored and requesting the sender to cease and desist from sending further text messages.

8. The non-transitory computer readable storage medium of claim 7, the operations further comprising:

retrieving the text message and associated signaling data from a database.

9. The non-transitory computer readable storage medium of claim 8 wherein the text message is a translation from text message shorthand to standard language usage.

10. The non-transitory computer readable storage medium of claim 8 wherein the report is additionally delivered to one of a guardian of the intended recipient and a designated third party.

11. The non-transitory computer readable storage medium of claim 7, the operations further comprising, after the analyzing the signaling data, attaching an indicator to the text message.

12. The non-transitory computer readable storage medium of claim 8 wherein a group of text messages and a group of associated signaling data that are sent by a group of subscribers are stored in the database.

* * * * *